(12) United States Patent
Cheng (10) Patent No.: US 8,434,360 B2
(45) Date of Patent: May 7, 2013

(54) SYSTEM AND METHOD FOR DETECTING ICE ON A WIND TURBINE ROTOR BLADE

(75) Inventor: Christopher D. Cheng, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 13/188,698

(22) Filed: Jul. 22, 2011

(65) Prior Publication Data

US 2012/0024053 A1 Feb. 2, 2012

(51) Int. Cl.
*G01W 1/00* (2006.01)
*F03D 7/04* (2006.01)

(52) U.S. Cl.
USPC ............................................. 73/170.26; 416/1

(58) Field of Classification Search ........................ None
See application file for complete search history.

(56) References Cited

U.S. PATENT DOCUMENTS

| 7,086,834 | B2 | 8/2006 | LeMieux | |
| 2005/0276696 | A1* | 12/2005 | LeMieux | 416/61 |
| 2006/0034692 | A1* | 2/2006 | Grabau | 416/132 B |
| 2009/0246019 | A1* | 10/2009 | Volanthen et al. | 416/1 |
| 2012/0161446 | A1* | 6/2012 | McNeill et al. | 290/55 |
| 2012/0175878 | A1* | 7/2012 | Wickstrom | 290/44 |
| 2012/0207589 | A1* | 8/2012 | Fridthjof | 415/121.3 |
| 2012/0226485 | A1* | 9/2012 | Creagh et al. | 703/7 |

* cited by examiner

*Primary Examiner* — Andre Allen
(74) *Attorney, Agent, or Firm* — Dority & Manning, P.A.

(57) ABSTRACT

A system and method for detecting ice on a rotor blade of a wind turbine are disclosed. In one embodiment, the method may include pitching the rotor blade across a range of pitch angles, monitoring an ice-related parameter of the wind turbine as the rotor blade is pitched and comparing the monitored ice-related parameter to a predetermined baseline profile for the ice-related parameter.

20 Claims, 4 Drawing Sheets

SYSTEM AND METHOD FOR DETECTING ICE ON A WIND TURBINE ROTOR BLADE

FIELD OF THE INVENTION

The present subject matter relates generally to wind turbines and, more particularly, to a system and method for detecting ice on a wind turbine rotor blade.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Under some atmospheric conditions, ice may be buildup or otherwise accumulate on the rotor blades of a wind turbine. As the ice layer accumulating on a rotor blade becomes increasingly thicker, the aerodynamic surface of the blade is modified, thereby resulting in diminished aerodynamic performance. Moreover, ice accumulation significantly increases the weight of a rotor blade, which can lead to structural damage as an increased amount of bending moments and/or other rotational forces act on the rotor blade. In addition, when there is a differential in the amount of ice accumulating on each of the rotor blades, a mass imbalance may occur that can cause significant damage to a wind turbine.

Due to the disadvantages associated with ice accumulation, a wind turbine may be shutdown when it is believed that ice has accumulated on the surface of one or more of the rotor blades. Operation of the wind turbine may then be restarted after it can be verified that ice is no longer present on the rotor blades. Accordingly, upon shutdown of a wind turbine for ice accumulation, each rotor blade must be inspected to determine whether ice is actually and/or is still present on the blades. Conventionally, this requires that each blade be visually inspected from a location on the ground. However, due to the risk of falling ice, the service worker(s) performing the visual inspection must be located a safe distance away from the wind turbine. As such, it is often difficult to visually detect ice accumulation on the rotor blades. Moreover, such a visual inspection of the rotor blade blades typically takes a significant amount of time, which may unnecessarily increase that amount of time that a wind turbine is shutdown to check for ice accumulations.

Accordingly, a system and method that allows for the accurate and efficient detection of ice on a wind turbine rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for detecting ice on a rotor blade of a wind turbine. The method may generally include pitching the rotor blade across a range of pitch angles, monitoring an ice-related parameter of the wind turbine as the rotor blade is pitched and comparing the monitored ice-related parameter to a predetermined baseline profile for the ice-related parameter.

In another aspect, the present subject matter is directed to a system for detecting ice on a rotor blade of a wind turbine. The system may generally include a pitch adjustment mechanism configured to pitch the rotor blade and a sensor configured to monitor an ice-related parameter of the wind turbine as the rotor blade is pitched. In addition, the system may include a controller communicatively coupled to the pitch adjustment mechanism and the sensor. The controller may be configured to control the pitch adjustment mechanism so that the rotor blade is pitched across a range of pitch angles. Moreover, the controller may be configured to receive signals from the sensor related to the ice-related parameter and compare the ice-related parameter to a predetermined baseline profile to determine if any ice is present on the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for detecting ice on a wind turbine rotor blade. Specifically, the disclosed system and method provide a means for detecting ice accumulations on a rotor blade while a wind turbine is not operating. For example, in several embodiments, upon shutdown of a wind turbine, each rotor blade may be pitched across a range of pitch angles while an ice-related parameter of the wind turbine is monitored. The monitored ice-related parameter may then be compared to a predetermined baseline profile for such parameter in order to determine whether ice is present on any of the rotor blades.

Figure 1:
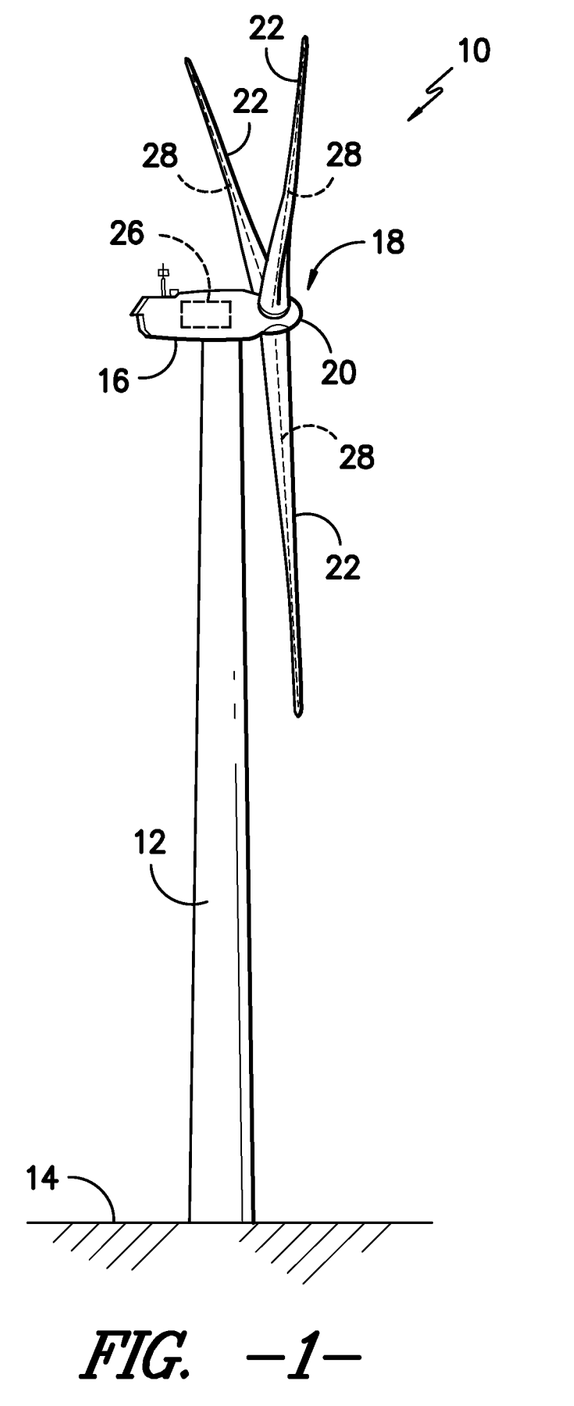
FIG. 1 illustrates a perspective view of one embodiment of a wind turbine.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives or pitch adjustment mechanisms 30 (FIG. 2) of the wind turbine 10. During operation of the wind turbine 10, the controller 26 may generally control each pitch adjust mechanism 30 in order to alter the pitch angle of each rotor blade 22 between 0 degrees (i.e., a power position of the rotor blade 22) and 90 degrees (i.e., a feathered position of the rotor blade 22).

Figure 2:
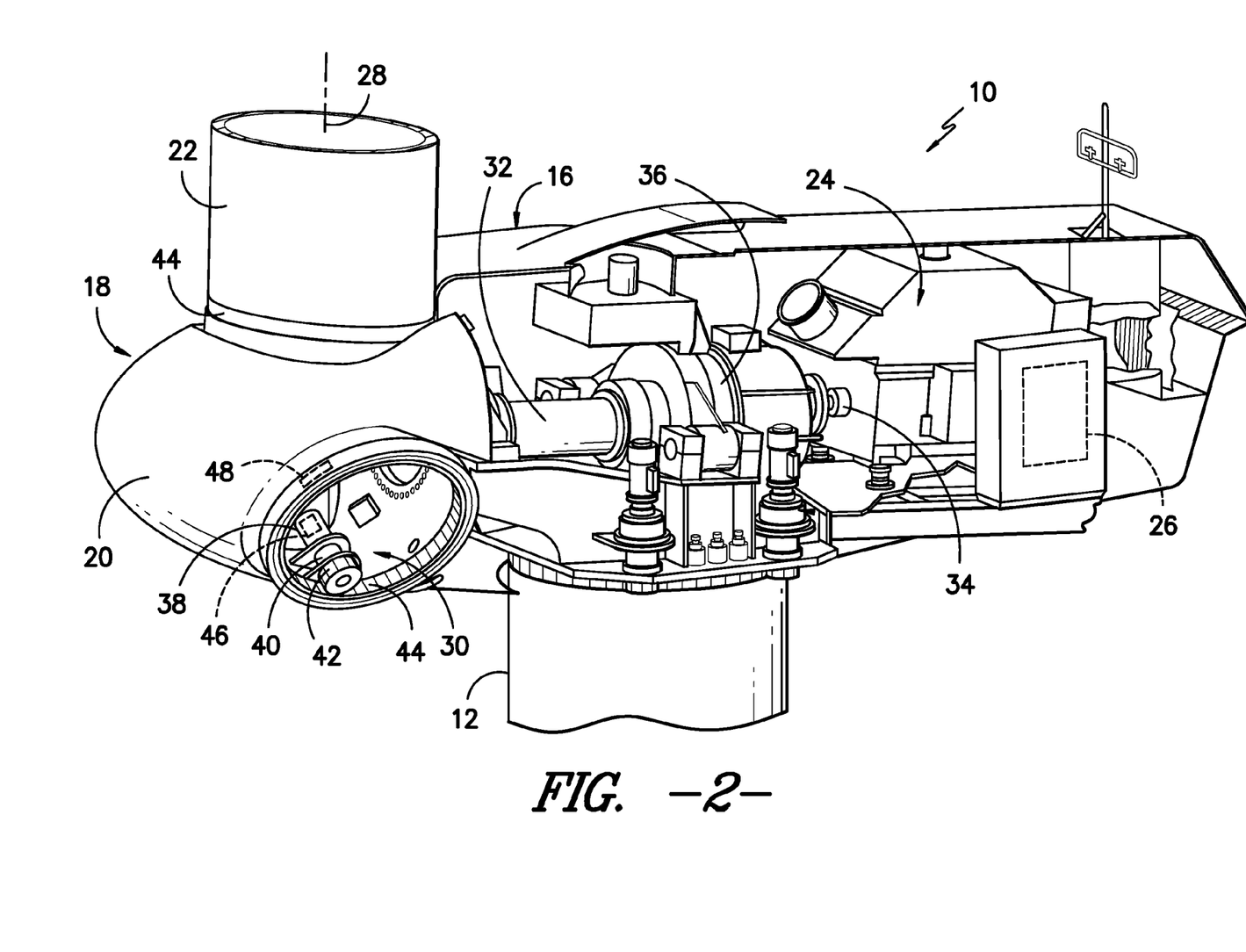
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above, each pitch adjustment mechanism 30 may include a hydraulic or pneumatic driven device that utilizes fluid pressure to apply torque to the pitch bearing 44.

Referring still to FIG. 2, the wind turbine may also include a plurality of sensors 46, 48 for monitoring one or more parameters and/or conditions of the wind turbine 10. As used herein, a parameter or condition of the wind turbine 10 is "monitored" when a sensor 46, 48 is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26 or other suitable device to determine the actual parameter and/or condition.

Thus, in several embodiments of the present subject matter, the wind turbine 10 may include one or more sensors 46, 48 configured to monitor the amount of torque required to pitch each rotor blade 22 about its pitch axis 28. Specifically, in several embodiments, the wind turbine 10 may include one or more sensors 46 configured to transmit signals to the turbine controller 26 relating directly to the amount of torque generated by each pitch adjustment mechanism 30. For example, the sensor(s) 46 may comprise one or more torque sensors coupled to a portion of the pitch drive motor 38, the pitch gearbox 40 and/or the pitch drive pinion 42 in order to monitor the torque generated by each pitch adjustment mechanism 30. Alternatively, the sensor(s) 46 may comprise one or more suitable sensors configured to transmit signals to the turbine controller 26 relating indirectly to the amount of torque generated by each pitch adjustment mechanism 30. For instance, in embodiments in which the pitch drive mechanism 30 is electrically driven, the sensor(s) 46 may comprise one or more current sensors configured to detect the electrical current supplied to the pitch drive motor 38 of each pitch adjustment mechanism 30. Similarly, in embodiments in which the pitch adjustment mechanism 30 is hydraulically or pneumatically driven, the sensor(s) 42 may comprise one or more suitable pressure sensors configured to detect the pressure of the fluid within the hydraulically or pneumatically driven device. In such embodiments, the turbine controller 26 may generally include suitable computer-readable instructions (e.g., in the form of suitable equations, transfer functions, models and/or the like) that, when implemented, configure the controller 26 to correlate the current input or the pressure input to the torque generated by each pitch adjustment mechanism 30.

In addition to the sensor(s) 46 described above or as an alternative thereto, the wind turbine 10 may also include one or more sensors 48 configured to monitor the torque required to pitch each rotor blade 22 by monitoring the force(s) present at the pitch bearing 44 (e.g., the force(s) present at the interface between the pitch drive pinion 42 and the pitch bearing 44). For example, the sensor(s) 48 may comprise one or more pressure sensors and/or any other suitable sensors configured to transmit signals relating to the forces present at the pitch bearing 44. In such an embodiment, similar to that described above, the turbine controller 26 may generally include suitable computer-readable instructions (e.g., in the form of suitable equations, transfer functions, models and the like) that, when implemented, configure the controller 26 to correlate the force(s) present at the pitch bearing 44 to the torque required to pitch each rotor blade 22.

It should be appreciated that the wind turbine 10 may also include various other sensors for monitoring any other suitable parameters and/or conditions of the wind turbine 10. For example, the wind turbine 10 may include sensors for monitoring the pitch angle of each rotor blade 22, any bending moments on the rotor blades 22, the speed of the rotor 18 and/or the rotor shaft 32, the speed of the generator 24 and/or the generator shaft 34, the torque on the rotor shaft 32 and/or the generator shaft 34, the wind speed and/or wind direction and/or any other suitable parameters and/or conditions.

Figure 3:
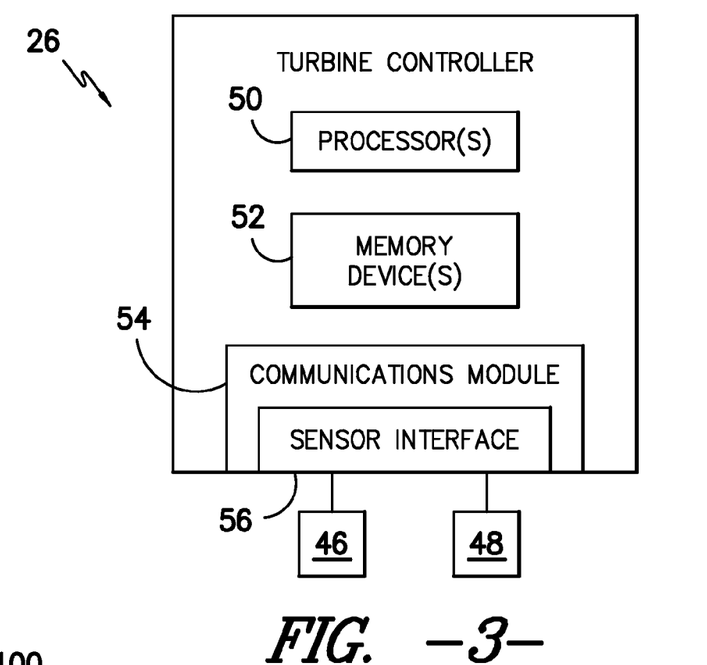
FIG. 3 illustrates a schematic diagram of one embodiment of suitable components that may be included within a turbine controller of a wind turbine.

Referring now to FIG. 3, there is illustrated a block diagram of one embodiment of suitable components that may be included within the turbine controller 26 in accordance with aspects of the present subject matter. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the pitch adjustment mechanisms 30, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 for controlling the pitch angle of the rotor blades 22. Moreover, the communications module 54 may include a sensor interface 56 (e.g., one or more analog-to-digital converters) to permit signals transmitted from the sensors 46, 48 of the wind turbine 10 to be converted into signals that can be understood and processed by the processors 50.

It should be appreciated that the sensors 46, 48 may be communicatively coupled to the communications module 54 using any suitable means. For example, as shown in FIG. 3, each sensor 46, 48 is coupled to the sensor interface 56 via a wired connection. However, in other embodiments, the sensors 46, 48 may be coupled to the sensor interface 56 via a wireless connection, such as by using any suitable wireless communications protocol known in the art.

Figure 4:
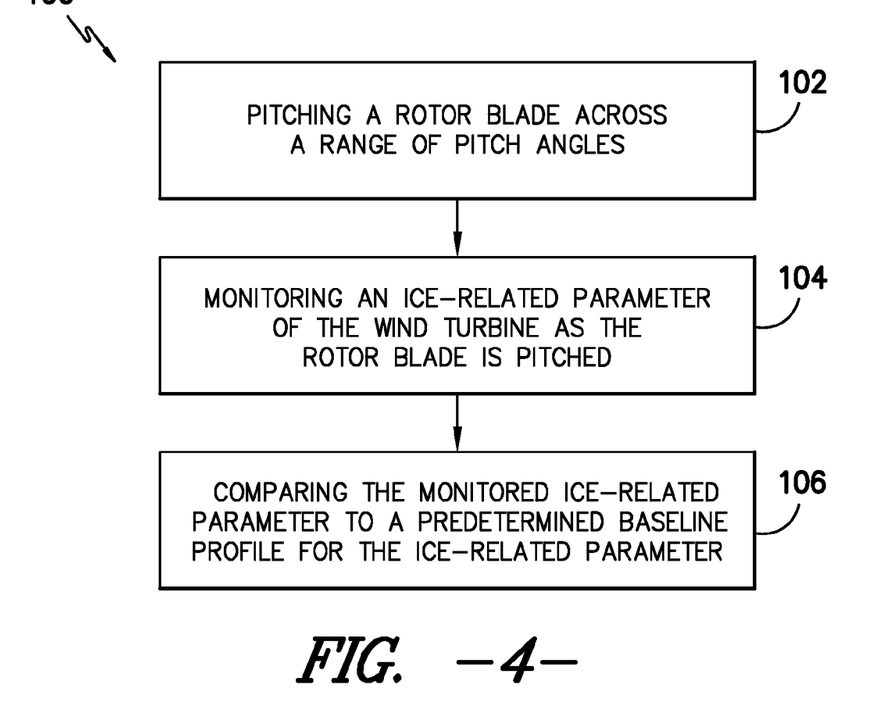
FIG. 4 illustrates a flow diagram of one embodiment of a method for detecting ice on a rotor blade of a wind turbine.

Referring now to FIG. 4, there is illustrated a flow diagram of one embodiment of a method 100 for detecting ice on a wind turbine rotor blade. As shown, the method 100 generally includes pitching a rotor blade across a range of pitch angles 102, monitoring an ice-related parameter of the wind turbine as the rotor blade is pitched 104 and comparing the monitored ice-related parameter to a predetermined baseline profile for the ice-related parameter 106.

In general, the disclosed method 100 provides a simple and accurate test for detecting ice accumulation on a rotor blade 22. Specifically, the disclosed method 100 provides a test for detecting ice accumulation on a rotor blade 22 while a wind turbine 10 is not operating (i.e., when the rotor 18 is not rotating). For example, as indicated above, wind turbines 10 are often shutdown when it is believed that ice is accumulating on one or more of the rotor blades 22 in order to prevent damage to the rotor blades 22 and/or to decrease the likelihood of damage/injury that may be caused by ice falling from the rotor blades 22. Moreover, when a wind turbine 10 is shutdown due to the belief or actual presence of ice accumulations on one or more of the rotor blades 22, operation of the wind turbine 10 is not typically restarted until it has been verified that ice is no longer present on the blade(s) 22. Accordingly, the disclosed method 100 may allow for the presence of ice to be quickly and accurately detected, thereby minimizing downtime of the wind turbine 10.

In several embodiments, it should be appreciated that the disclosed method 100 may be performed automatically by the turbine controller 26. For example, the turbine controller 26 may be provided with suitable computer-readable instructions that, when implemented, configure the controller 26 to transmit control signals to the pitch adjustment mechanisms 30 in order to pitch the rotor blades 22 across a range of pitch angles. Moreover, the turbine controller 26 may be configured to monitor an ice-related parameter of the wind turbine 10 as each rotor blade 22 is pitched and, based on the ice-related parameter, determine whether any ice has accumulated on the blades 22. For instance, the controller 26 may be configured to compare the monitored ice-related parameter to a predetermined baseline profile for such parameter in order to determine whether ice is present on the rotor blade(s) 22.

As shown in FIG. 4, in 102, one or more of the rotor blades 22 may be pitched across a range of pitch angles. As indicated above, the disclosed method 100 is generally designed as a non-operating ice detection test. Thus, in several embodiments, the wind turbine 10 may be shutdown prior to pitching the rotor blade(s) 22 across the range of pitch angles. For example, each of the rotor blades 22 may be initially pitched to the feathered position (i.e., a 90 degree pitch angle) in order to stop rotation of the rotor 18 and, thus, halt operation of the wind turbine 10.

Upon shutdown of the wind turbine 10, the rotor blades 22 may then be pitched across the range of pitch angles using the pitch adjustment mechanisms 30 described above. In several embodiments, the turbine controller 26 may be configured to control the pitch adjustment mechanisms 30 individually such that the rotor blades 22 are pitched one at a time. For instance, the controller 26 may be adapted to initially transmit suitable control signals to one of the pitch adjustment mechanisms 30 so that only the rotor blade 22 controlled by such pitch adjustment mechanism 30 is pitched across the range of pitch angles. After pitching the rotor blade 22 and returning it to the feathered position, the controller 26 may then transmit suitable control signals to one of the other pitch adjustment mechanisms 30 so that another rotor blade 22 is pitched across the range of pitch angles. By pitching each of the rotor blades 22 in this manner, the rotor blades 22 not being tested may be maintained at the feathered position, thereby preventing the rotor 18 from rotating.

In general, each rotor blade 22 may be pitched across any suitable range of pitch angles during the performance of the disclosed method 100. As will be described in greater detail below, the pitching of each rotor blade 22 is generally performed so that an ice-related parameter of the wind turbine 10 may be monitored as the blade 22 is pitched, thereby providing an indication of whether ice has accumulated on the blade 22. Thus, it should be appreciated that the angular range across which each rotor blade 22 is pitched may generally vary depending on numerous factors including, but not limited to, the configuration of each rotor blade 22, the configuration of the wind turbine 10, the particular ice-related parameter being monitored and/or the amount of data needed regarding the ice-related parameter in order to provide an accurate estimation of whether ice is present on a rotor blade 22. However, in several embodiments, each rotor blade 22 may generally be pitched at least 45 degrees from the feathered position, such as by pitching each rotor blade at least 90 degrees from the feathered position or at least 180 degrees from the feathered position and all other subranges therebetween. For instance, in one embodiment, each rotor blade 22 may be pitched a total of about 180 degrees, such as by pitching each rotor blade 22 from the feathered position to the power position and back to the feathered position. In another embodiment, each rotor blade 22 may be pitched a full revolution (i.e., 360 degrees) in a clockwise or counter-clockwise direction about the pitch axis 28.

Referring still to FIG. 4, in 104, an ice-related parameter of the wind turbine 10 is monitored as the rotor blade 22 is pitched across the range of pitch angles. As used herein, the term "ice-related parameter" generally refers to any parameter and/or condition of a wind turbine 10 that may vary as a rotor blade 22 is pitched depending on whether ice is present on the blade 22. For instance, in several embodiments, the ice-related parameter may correspond to the amount of torque required to pitch each rotor blade 22 across the range of pitch angles. Specifically, as indicated above, ice accumulation on a rotor blade 22 may increase its weight and may also alter its mass distribution. Thus, the torque required to pitch a rotor blade 22 having no ice accumulation may generally vary from the torque required to pitch the same rotor blade 22 having ice accumulated thereon.

As indicated above, the torque required to pitch each rotor blade 22 may be monitored using one or more suitable sensors 46, 48. For example, the torque generated by each pitch adjustment mechanism 30 may be monitored directly using suitable torque sensors or indirectly using various other suitable sensors (e.g., current sensors and/or pressure sensors configured monitor the current input and/or pressure input to the pitch adjustment mechanism 30). Alternatively, the torque required to pitch each rotor blade may be monitored by monitoring the force present at the pitch bearing 44 of the wind turbine 10.

In other embodiments, the ice-related parameter may correspond to the amount of time required to pitch each rotor blade 22 across the range of pitch angles. For example, in one embodiment, each pitch adjustment mechanism 30 may be configured to pitch each rotor blade 22 with a constant torque. As such, due to the increase in weight and/or the varied mass distribution caused by ice accumulations, the time required to pitch each rotor blade 22 may vary depending on the presence of ice. In such embodiments, the turbine controller 26 may generally be configured to monitor the time required to pitch each rotor blade 22. For example, the controller 26 may be provided with suitable computer readable instructions and/or suitable digital hardware (e.g., a digital counter) that configures the controller 26 to monitor the amount of time elapsed while each blade 22 is pitched across the range of pitch angles.

In even further embodiments, it should be appreciated that the ice-related parameter may correspond to any other suitable parameter and/or condition of the wind turbine 10 that provides an indication of the presence of ice on a rotor blade 22. For example, the ice-related parameter may correspond to bending moments and/or other stresses acting on the rotor blade 22, as such bending moments and/or other stresses may generally vary due to the increased weight caused by ice accumulations. In such an embodiment, one or more strain gauges and/or other suitable sensors may be installed within the rotor blade 22 to permit such bending moments and/or other stresses to be monitored.

Referring still to FIG. 4, in 106, the monitored ice-related parameter may be compared to a predetermined baseline profile in order to determine whether ice is actually present on the rotor blade 22. In general, the baseline profile may correspond to a predetermined set of reference values that are equal to the anticipated or actual values of the ice-related parameter being monitored assuming no ice is present on the rotor blade 22 being pitched. For example, when the ice-related parameter corresponds to the amount of torque required to pitch each rotor blade 22, the baseline profile may comprise a predetermined set of values equal to the amount of torque required to pitch each rotor blade 22 across the range of pitch angles when no ice is present on the blade 22. Accordingly, variations from the baseline profile may generally provide an indication of ice accumulations on the rotor blade 22.

It should be appreciated that the baseline profile for a particular ice-related parameter may generally vary from wind turbine 10 to wind turbine 10 and/or from rotor blade 22 to rotor blade 22. Thus, in several embodiments, individual baseline profiles for the ice-related parameter being monitored may be determined for each rotor blade 22. In general, the baseline profiles for the rotor blades 22 may be determined using any suitable means and/or method known in the art. For instance, in one embodiment, the baseline profile of each rotor blade 22 may be determined experimentally, such as by individually pitching each rotor blade 22 across the range of pitch angles when it is known that no ice is present on the blade 22 and monitoring the ice-related parameter of the blade 22 to establish the baseline profile. In another embodiment, the baseline profile for each rotor blade 22 may be modeled or determined mathematically, such as by calculating the baseline profiles based on, for example, the configuration of each rotor blade 22, the specifications of each pitch adjustment mechanism 30 and/or the anticipated variation in the ice-related parameter due to the presence of ice.

It should also be appreciated that, in several embodiments, the baseline profile established for a particular rotor blade 22 may be continuously updated. Specifically, due to wear and tear on wind turbine components and other factors, the baseline profile for a rotor blade 22 may vary over time. For example, wear and tear on one of the pitch bearings 44 may significantly affect the baseline profile for the corresponding rotor blade 22. Thus, in several embodiments, the turbine controller 26 may be configured to continuously adjust the baseline profile for each rotor blade 22 based on calculated and/or anticipated turbine component wear and/or on any other factors that may cause the baseline profile to vary over time.

Figure 5:
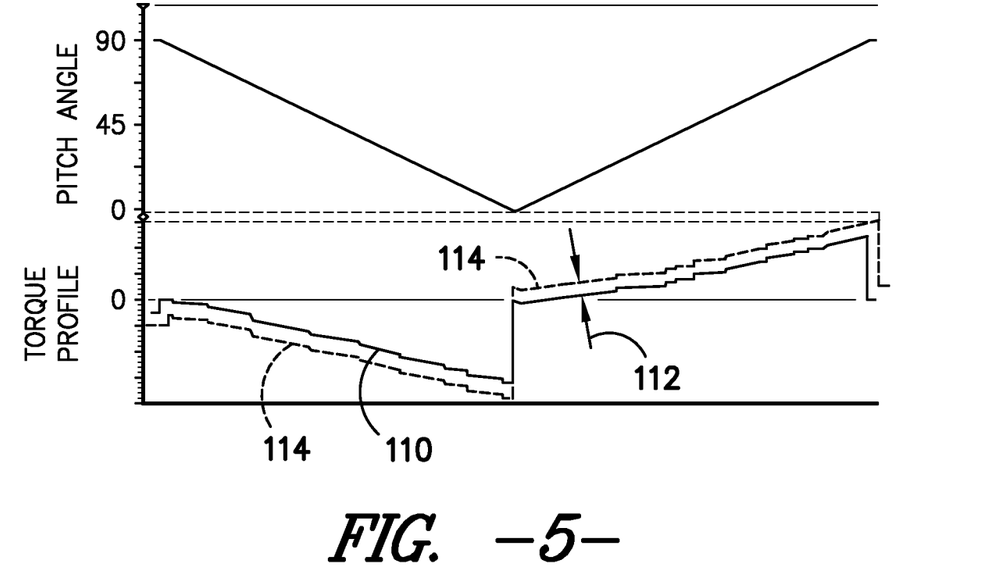
FIG. 5 illustrates one embodiment of a baseline torque profile for a rotor blade across a range of pitch angles; and, FIG. 6 illustrates one embodiment of a baseline time profile for a rotor blade across a range of pitch angles.

Referring now to FIG. 5, one example of a baseline torque profile 110 for the torque required to pitch a rotor blade 22 across a range of pitch angles is illustrated in accordance with aspects of the present subject matter. Specifically, the baseline torque profile 110 is charted for a rotor blade 22 having no ice accumulation for pitch angles extending from the feathered position to the power position and back to the feathered position. Thus, as the rotor blade 22 is pitched across such pitch angles during the performance of the disclosed method 100, the torque required to pitch the blade 22 may be continuously compared to the baseline torque profile 110 to determine if any ice has accumulated on the rotor blade 22.

Additionally, in several embodiments, a predetermined tolerance or percent variation 112 may be incorporated into the baseline profile 110 to accommodate slight deviations that may result from sensor inaccuracies, component wear and/or other factors that are not associated with ice accumulations on a rotor blade 22. For example, as shown in FIG. 5, a range of torque values for each pitch angle may be banded between the baseline torque profile 110 and line 114 that corresponds to an allowable percent variation 112 from the baseline torque profile 110. Thus, as long as the monitored torque values for the rotor blade 22 remain within the area defined between the baseline torque profile 110 and line 114, it may be assumed that no ice is present on the blade 22. However, if any of the monitored torque values fall outside the allowable percent variation 112, it may be assumed that ice has accumulated on the rotor blade 22 and operation of the wind turbine 10 may be delayed until it is determined that the ice is no longer present on the blade 22. For example, the turbine controller 26 may be configured to wait a predetermined amount of time and then re-perform the disclosed method 10 in order to determine if the ice previously detected has melted away or has otherwise been removed from the rotor blade 22.

It should be appreciated that the allowable percent variation 112 from the baseline profile 110 may generally vary based on numerous factors including, but not limited to, the configuration of the rotor blade, 22 the accuracy of any sensors 46, 48 being utilized and/or the actual and/or anticipated wear on any relevant wind turbine components (e.g., the pitch bearing 44). However, it is well within the skill of one of ordinary skill in the art to determine a suitable percent variation 112 for each baseline profile 110 based on the factors described above and/or any other suitable factors that may cause variations in the baseline profile 110 and/or the ice-related parameter being monitored. It should also be appreciated that the allowable percent variation 112 need not only correspond to an increase in the magnitude of the torque required to pitch the blade 22 as shown in FIG. 4. For example, in other embodiments, the allowable percent variation 112 may correspond to a plus/minus variation in the baseline torque profile 110 or a decrease increase in the magnitude of the torque required to pitch the blade 22.

Figure 6:
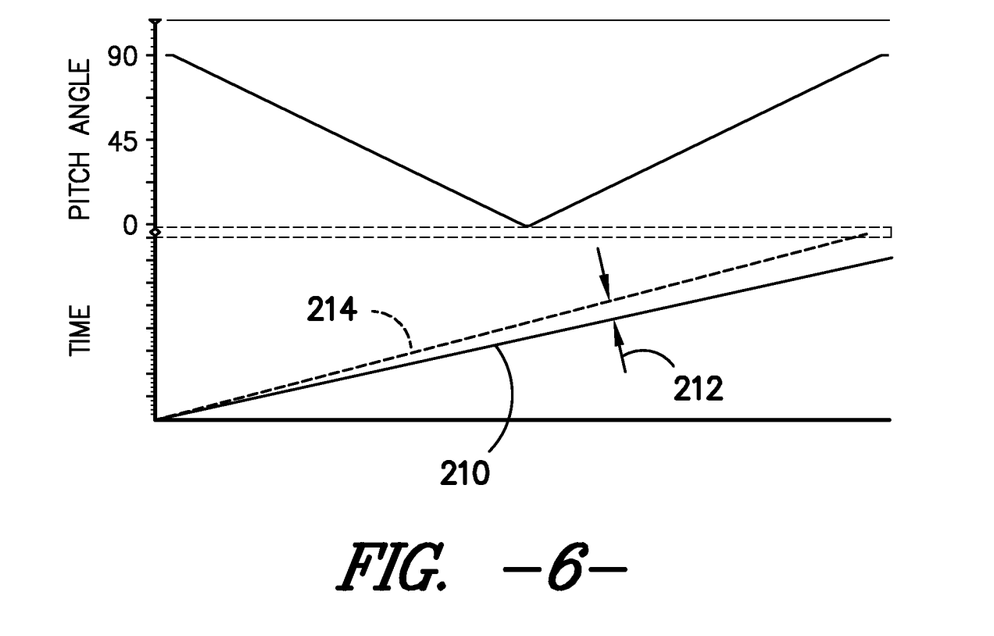

Referring now to FIG. 6, an example of a baseline time profile 210 for the amount of time required to pitch a rotor blade 22 across a range of pitch angles at a constant torque is illustrated in accordance with aspects of the present subject matter. Specifically, the baseline time profile 210 is charted for a rotor blade 22 having no ice accumulation for pitch angles extending from the feathered position to the power position and back to the feathered position. Thus, as the rotor blade 22 is pitched across such pitch angles during the performance of the disclosed method 100, the amount of time required to pitch the blade 22 may be continuously compared to the baseline time profile 210 to determine if any ice has accumulated on the rotor blade 22.

Additionally, similar to that shown in FIG. 5, in several embodiments, a predetermined tolerance or percent variation 212 may be incorporated into the baseline profile 210. For example, as shown in FIG. 6, a range of time values for each pitch angle may be banded between the baseline time profile 210 and line 214 that corresponds to an allowable percent variation 212 from the baseline time profile 210. Thus, as long as the monitored time values remain within the area defined between the baseline time profile 210 and line 214, it may be assumed that no ice is present on the rotor blade 22. However, if any of the monitored time values fall outside the allowable percent variation 212, it may be assumed that ice has accumulated on the rotor blade 22 and operation of the wind turbine 10 may be delayed until it is determined that the ice is no longer present on the blade 22 (e.g., by re-performing the disclosed method 100 after a predetermined amount of time).

As indicated above, it should be appreciated that the present subject matter is also directed to a system for detecting ice on a wind turbine rotor blade 22. Thus, in several embodiments, the system may generally include a pitch adjustment mechanism 30 configured to pitch the rotor blade 22 about its pitch axis 28 and one or more sensors 46, 48 configured to monitor an ice-related parameter of the wind turbine 10 as the blade 22 is pitched. Additionally, the system may include a controller 26 communicatively coupled to the pitch adjustment mechanism 30 and the sensor(s) 46, 48. As described above, the controller 26 may be configured to control the pitch adjustment mechanism 30 so that the rotor blade 22 is pitched across a range of pitch angles. In addition, the controller 26 may also be configured to receive signals from the sensor(s) 46, 48 related to the ice-related parameter being monitored and compare such monitored parameter to a predetermined baseline profile to determine if any ice is present on the rotor blade 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detecting ice on a rotor blade of a wind turbine, the method comprising:
    pitching the rotor blade across a range of pitch angles;
    monitoring an ice-related parameter of the wind turbine as the rotor blade is pitched; and,
    comparing the monitored ice-related parameter to a predetermined baseline profile for the ice-related parameter.

2. The method of claim 1, wherein pitching the rotor blade across a range of pitch angles comprises pitching the rotor blade across the range of pitch angles while the wind turbine is not operating.

3. The method of claim 1, wherein pitching the rotor blade across a range of pitch angles comprises pitching the rotor blade from a feathered position at least 45 degrees.

4. The method of claim 1, wherein pitching the rotor blade across a range of pitch angles comprises pitching the rotor blade from a feathered position to a power position.

5. The method of claim 1, wherein monitoring an ice-related parameter of the wind turbine as the rotor blade is pitched comprises monitoring an amount of torque required to pitch the rotor blade across the range of pitch angles.

6. The method of claim 5, wherein monitoring an amount of torque required to pitch the rotor blade across the range of pitch angle comprises:
    monitoring a current input to a pitch adjustment mechanism of the wind turbine as the rotor blade is pitched; and,
    correlating the current input to the amount of torque required to pitch the rotor blade.

7. The method of claim 6, wherein monitoring a current input to a pitch adjustment mechanism of the wind turbine as the rotor blade is pitched comprises receiving by a controller a signal associated with the current input to the pitch adjustment mechanism.

8. The method of claim 5, wherein monitoring an amount of torque required to pitch the rotor blade across the range of pitch angle comprises:
    monitoring a pressure input to a pitch adjustment mechanism of the wind turbine as the rotor blade is pitched; and,
    correlating the pressure input to the amount of torque required to pitch the rotor blade.

9. The method of claim 8, wherein monitoring a pressure input to a pitch adjustment mechanism of the wind turbine as the rotor blade is pitched comprises receiving by a controller a signal associated with the pressure input to the pitch adjustment mechanism.

10. The method of claim 5, wherein monitoring an amount of torque required to pitch the rotor blade across the range of pitch angle comprises:
    monitoring a force present at a pitch bearing of the rotor blade as the rotor blade is pitched; and,
    correlating the force to the amount of torque required to pitch the rotor blade.

11. The method of claim 10, wherein monitoring a force present at a pitch bearing of the rotor blade as the rotor blade is pitched comprises receiving by a controller a signal associated with the force present at the pitch bearing.

12. The method of claim 1, wherein pitching the rotor blade across a range of pitch angles comprises pitching the rotor blade across a range of pitch angles with a constant torque.

13. The method of claim 12, wherein monitoring an ice-related parameter of the wind turbine as the rotor blade is pitched comprises monitoring an amount of time it takes for the rotor blade to be pitched across the range of pitch angles.

14. The method of claim 1, wherein comparing the monitored ice-related parameter to a predetermined baseline profile for the ice-related parameter comprises determining whether the ice-related parameter falls within a percent variation of the predetermined baseline profile.

15. A system for detecting ice on a rotor blade of a wind turbine, the system comprising:
    a pitch adjustment mechanism configured to pitch the rotor blade;
    a sensor configured to monitor an ice-related parameter of the wind turbine as the rotor blade is pitched; and
    a controller communicatively coupled to the pitch adjustment mechanism and the sensor, the controller being configured to control the pitch adjustment mechanism so that the rotor blade is pitched across a range of pitch angles, the controller being further configured to receive signals from the sensor related to the ice-related parameter and compare the ice-related parameter to a predetermined baseline profile to determine if any ice is present on the rotor blade.

16. The system of claim 15, wherein the ice-related parameter comprises an amount of torque required to pitch the rotor blade across the range pitch angles.

17. The system of claim 15, wherein the sensor comprises a current sensor configured to monitor a current input to the pitch adjustment mechanism or the sensor the comprises a pressure sensor configured to monitor a pressure input to the pitch adjustment mechanism.

18. The system of claim 15, wherein the sensor is configured to monitor a force present at a pitch bearing of the wind turbine.

19. The system of claim 15, wherein the controller is configured to control the pitch adjustment mechanism so that the rotor blade is pitched from a feathered position at least 45 degrees.

20. The system of claim 14, wherein the controller is configured to control the pitch adjustment mechanism so that the rotor blade is pitched across the range of pitch angles while the wind turbine is not operating.

* * * * *